US012230429B2

(12) United States Patent
Ettl

(10) Patent No.: US 12,230,429 B2
(45) Date of Patent: Feb. 18, 2025

(54) TRANSPORTABLE POWER TRANSFORMER UNIT

(71) Applicant: Siemens Energy Global GmbH & Co. KG, Munich (DE)

(72) Inventor: Christian Ettl, Weiz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 794 days.

(21) Appl. No.: 16/962,340

(22) PCT Filed: Jan. 15, 2018

(86) PCT No.: PCT/EP2018/050859

§ 371 (c)(1),
(2) Date: Jul. 15, 2020

(87) PCT Pub. No.: WO2019/137623

PCT Pub. Date: Jul. 18, 2019

(65) Prior Publication Data

US 2020/0343033 A1 Oct. 29, 2020

(51) Int. Cl.
*H01F 27/00* (2006.01)
*H01F 27/02* (2006.01)
(Continued)

(52) U.S. Cl.
CPC ........... *H01F 27/12* (2013.01); *H01F 27/025* (2013.01); *H01F 27/24* (2013.01); *H01F 27/32* (2013.01)

(58) Field of Classification Search
CPC ........ H01F 27/12; H01F 27/025; H01F 27/24; H01F 27/32; H01F 27/002; H01F 27/10;
(Continued)

(56) References Cited

U.S. PATENT DOCUMENTS 2,341,058 A * 2/1944 Paluev .................... H01F 27/14 165/104.31
3,123,783 A * 3/1964 Wilk ....................... H01F 27/14 174/12 R (Continued)

FOREIGN PATENT DOCUMENTS

DE 709004 C 8/1941
DE 721450 C 6/1942

(Continued)

*Primary Examiner* — Mang Tin Bik Lian

(74) *Attorney, Agent, or Firm* — Laurence A. Greenberg; Werner H. Stemer; Ralph E. Locher

(57) ABSTRACT

A power transformer unit includes at least one single-phase transformer for connection to a high-voltage network. Each single-phase transformer includes a tank filled with insulating fluid receiving a core having high and low-voltage windings, at least one bushing socket connected to the high or low-voltage winding by a winding connection cable inside the tank, at least one high-voltage bushing to be inserted into the bushing socket, cooling equipment for the fluid and an expansion vessel compensating for temperature-induced volume fluctuations of the fluid. To transport the power transformer unit as quickly as possible and to put the power transformer unit into operation in situ, the expansion vessel and the cooling equipment are mechanically firmly connected to the tank and together with the tank and each bushing socket form a transport unit having an external contour lying inside a predetermined transport profile.

13 Claims, 3 Drawing Sheets

(51) Int. Cl.

| | |
|---|---|
| ***H01F 27/12*** | (2006.01) |
| ***H01F 27/24*** | (2006.01) |
| ***H01F 27/32*** | (2006.01) |

(58) Field of Classification Search

CPC ...... H01F 27/105; H01F 27/125; H01F 27/14; H01F 27/16; H01F 27/18; H01F 27/02

See application file for complete search history.

(56) References Cited

U.S. PATENT DOCUMENTS

| | | | | |
|---|---|---|---|---|
| 3,872,414 | A * | 3/1975 | Schutz .................. | H01F 27/002 336/134 |
| 5,341,561 | A | 8/1994 | Schorm et al. | |
| 10,262,791 | B2 | 4/2019 | Ettl | |
| 10,460,866 | B2 | 10/2019 | Ettl | |
| 10,685,772 | B2 | 6/2020 | Ettl | |
| 2004/0051615 | A1* | 3/2004 | Hafskjold .............. | H05K 5/068 336/57 |
| 2006/0017537 | A1* | 1/2006 | Prieto Colmenero .. | H01F 29/02 336/147 |
| 2011/0227685 | A1* | 9/2011 | Fogelberg ............... | H01F 27/02 336/90 |
| 2014/0133054 | A1* | 5/2014 | Carollo ................. | H01F 27/402 361/36 |
| 2014/0266529 | A1* | 9/2014 | Kendrick .............. | F16K 17/406 137/68.17 |
| 2016/0118186 | A1* | 4/2016 | Frimpong ................ | F41J 5/056 307/119 |
| 2017/0274419 | A1* | 9/2017 | Frimpong ............... | G01S 3/808 |
| 2017/0316861 | A1 | 11/2017 | Ettl | |
| 2018/0068758 | A1* | 3/2018 | Jendenmalm ............. | B32B 5/16 |

FOREIGN PATENT DOCUMENTS

| | | | |
|---|---|---|---|
| DE | 749246 | C | 1/1945 |
| DE | 918695 | C | 10/1954 |
| DE | 932567 | C | 9/1955 |
| EP | 3057112 | A1 | 8/2016 |
| GB | 2464192 | A | 4/2010 |
| WO | WO9201328 | A1 | 1/1992 |
| WO | WO2012091805 | A2 | 7/2012 |
| WO | WO2017186748 | A2 | 11/2017 |
| WO | WO2017186749 | A1 | 11/2017 |
| WO | WO2017186750 | A2 | 11/2017 |
| WO | WO2017186751 | A1 | 11/2017 |

* cited by examiner

TRANSPORTABLE POWER TRANSFORMER UNIT

BACKGROUND OF THE INVENTION

Field of the Invention

The invention relates to a power transformer unit with at least one single-phase transformer that is configured for connection to a high-voltage grid, wherein each single-phase transformer comprises a tank filled with an insulating fluid in which a core with a high-voltage and low-voltage winding is arranged, at least one bushing socket that is connected via a winding connection line extending inside the tank to the high-voltage or low-voltage winding, at least one high-voltage bushing that can be inserted into the bushing socket, cooling equipment for cooling the insulating fluid and an expansion vessel that serves to compensate for temperature-induced volume fluctuations of the insulating fluid.

Such a power transformer unit is already known from WO 2017/186748 A2. The power transformer unit shown there has three single-phase transformers which are each provided for connection to a high-voltage grid. Each of the single-phase transformers has a separate tank in which a core with a high-voltage winding and a low-voltage winding is arranged. A bushing socket is fastened impermeably to a cover of the tank, into which a high-voltage bushing can be inserted. The bushing socket protrudes into the oil chamber of the tank where, with the aid of an inner wall made of a non-conductive insulating material, it holds a contact piece that is connected via a winding connection line to the high-voltage or low-voltage winding. An inner conductor of the high-voltage bushing—when this is inserted into the bushing socket—is connected to the respective winding via the contact piece and the winding connection line. Each bushing here has, at its end facing away from the insertion face, an outdoor terminal for connection to an air-insulated high-voltage line. Cooling equipment that is releasably connectable to the tank and an expansion vessel that is likewise releasably connectable to the tank are further disclosed in said document. A modular structure is provided through the releasable connection between the tank on the one hand and the cooling equipment, expansion vessel and high-voltage bushing on the other hand, allowing the single-phase transformer to be transported without great planning effort and for it to be brought into operation quickly in situ.

A power transformer unit with a modular structure is further known from WO 2017/186749 A1, WO 2017/186750 A2 and WO 2017/186751 A1.

SUMMARY OF THE INVENTION

The object of the invention is to provide a power transformer unit of the type mentioned at the beginning that can be brought into operation in situ even more quickly.

The invention achieves this object in that the expansion vessel and the cooling equipment are mechanically firmly connected to the tank and form, together with said tank and each bushing socket, a transport unit, wherein the transport unit has an external contour that lies inside a predefined transport profile.

According to the invention, a power transformer unit is provided that consists of at least one, and as a rule multiple, single-phase transformers. Each single-phase transformer is designed as a power transformer and provided for a connection to a high-voltage grid.

According to the invention, all the components of each single-phase transformer, with the exception of the high-voltage bushings, form a transport unit whose external contour lies inside a prescribed transport profile. Such a transport profile is, for example, given by a traffic regulation to be observed in the case of road transport that specifies the maximum height, width and length of a vehicle or of a vehicle combination. The transport unit according to the invention lies inside this transport profile and can therefore also be transported over usual traffic routes without complex planning. Only the weight of the transport unit, which can be between 50 and 200 tons, emerges as a limiting factor.

The transport unit consists, according to the invention, at least of the tank, the expansion vessel and the cooling equipment of the respective single-phase transformer, wherein the expansion vessel and the cooling equipment are firmly connected to the tank. Expedient connecting lines make it possible for insulating fluid to be able to be circulated out of the inside of the tank via the cooling equipment or, as a consequence of a rise in temperature, to be able to reach the expansion vessel from the tank.

Expedient lifting points are provided at the tank, on which a crane can engage to lift the transport unit. The transport unit is loaded, for example, onto the trailer of a truck or, alternatively, on a railway vehicle or in an aircraft. The compact nature of the transport unit here ensures that it can be loaded onto the respective vehicle easily and quickly. As a result of the limited need for planning, the transport can take place quickly, so that the entire power transformer unit can quickly be brought to the destination site. Only the high-voltage bushings then have to be inserted into the bushing sockets and connected to the respective lines of the high-voltage grid. Very fast commissioning can take place in situ in this way.

According to the invention, the tank, cooling equipment and expansion vessel are already filled with insulating fluid during the transport.

According to a preferred embodiment of the invention, the transport unit is less than 4.2 m in height, less than 3.3 m in width, and less than 9 m in length. These measurements have been found to be particularly expedient in order to avoid any problems meeting the requirements existing in the respective regions for a transported item.

Advantageously, the transport unit comprises, in addition to said components, also at least one motor drive, at least one sensor unit and at least one protection and monitoring device. Said additional components are advantageously fastened firmly to the tank or else also to the cooling equipment or to the expansion vessel, so that they form a firm mechanical assembly and therefore do not have to be assembled in situ in an elaborate manner. The components are here of course assembled in such a way that the maximum height, width and length of the transport unit lies inside the transport profile.

According to a preferred embodiment of the invention, the expansion vessel is box-shaped, extends in a longitudinal direction, and has a height between 50 cm and 250 cm. The expansion vessel extends expediently above the tank and parallel to it, wherein the distance from the tank is kept as small as possible and for example amounts to a few centimeters, for example 5 cm-30 cm. If the expansion vessel has, for example, a height of about 20 cm, the tank can have a height of more than 4 m without the transport unit protruding beyond the transport profile.

According to a preferred embodiment of the invention, the width of the expansion vessel is less than two thirds of the width of the tank.

In a further development in this respect, the length of the expansion vessel is greater than three quarters of the length of the tank. According to this further development of the invention, it is ensured that the expansion vessel has the necessary interior volume to be able to compensate for the volume fluctuations of the insulating fluid even in the event of larger temperature variations.

The tank and the expansion vessel each expediently extend in a longitudinal direction, wherein the two longitudinal directions run parallel to one another.

Both the expansion vessel and the tank are box-shaped according to this further development of the invention. The box of the expansion vessel extends over the tank with the smallest possible spacing. The lengths of the tank and expansion vessel advantageously lie in the same order of magnitude, while the width of the expansion vessel is smaller than the width of the tank. The expansion vessel is therefore only arranged above a partial region of the cover of the tank. A section of the tank is open at the top so that the high-voltage bushings can be arranged there.

According to a preferred embodiment of the invention, the tank comprises two longitudinal faces opposite one another and two end faces opposite one another that are connected to the longitudinal faces and have a shorter width than the longitudinal faces, wherein the cooling equipment is arranged at at least one of the end faces. In other words, the tank has a box-shaped external contour that deviates from the structure of a cube in that two faces of the box that are opposite one another are longer than the two other opposing faces, wherein the shorter faces are referred to here as end faces. According to this further development, the tank can be designed such that it has a width that is somewhat smaller than that of the transport profile. The length of the tank is chosen such that, together with the cooling equipment arranged at the end face, it does not exceed the maximum length of the transport profile. The arrangement of the cooling equipment at at least one of the end faces makes it possible in a particularly simple manner for the transport unit to be dimensioned such that it does not exceed the transport profile.

According to a further development in this respect, the cooling equipment comprises two cooling units that are arranged at different end faces. According to this advantageous further development, a cooling unit of the cooling equipment is arranged at a first end face. The other cooling unit of the cooling equipment is mounted at the opposite end face of the tank, wherein both cooling units are connected to the interior of the tank via an inlet and outlet, so that the insulating fluid can be circulated through the respective cooling unit. The circulation can take place in a passive or active manner within the scope of the invention.

According to an embodiment of the invention that is expedient in this respect, the cooling equipment comprises an inlet and an outlet which are both arranged underneath a cooling unit of the cooling equipment. According to this advantageous further development, it is made possible for the expansion vessel to be arranged with only a short clearance above the tank.

The bushing sockets are expediently arranged in a cover of the tank. Domes that usually are provided at the tank are avoided according to this advantageous further development. It is true that domes enlarge the interior volume of the tank and therefore make it easier to accommodate a bushing. Such a dome would, however, not allow the expansion vessel to be arranged with a small clearance from the cover of the tank.

The windings expediently comprise an aramid insulation. Aramid is an insulation material that is assigned to a high thermal class, and is able to provide the necessary dielectric strength even in the event of high temperatures of the insulation fluid inside the tank. The aramid insulation serves, for example, firstly to hold the winding conductors of the winding at a fixed spacing from one another.

An aramid insulation can, moreover, also serve for guiding connecting lines in a voltage-proof manner. An aramid insulation or another insulating material of this thermal class that can likewise be used in the place of an aramid insulation is, however, known to those skilled in the art, and so further explanations in this respect can be omitted.

The insulating fluid is advantageously an ester oil. In contrast with mineral oils, ester oils have the advantage that they are ecologically harmless. Transformers whose tank is filled with ester oil can, in addition, be operated at higher temperatures than would be the case with a comparable transformer filled with mineral oil. Through the selection of an ester oil as the insulating fluid, the transport unit can therefore be of yet more compact design.

Further expedient embodiments and advantages of the invention are the subject matter of the following description of exemplary embodiments of the invention with reference to the figures of the drawing, wherein the same reference signs refer to components having the same effect.

DETAILED DESCRIPTION OF THE INVENTION

Figure 1:
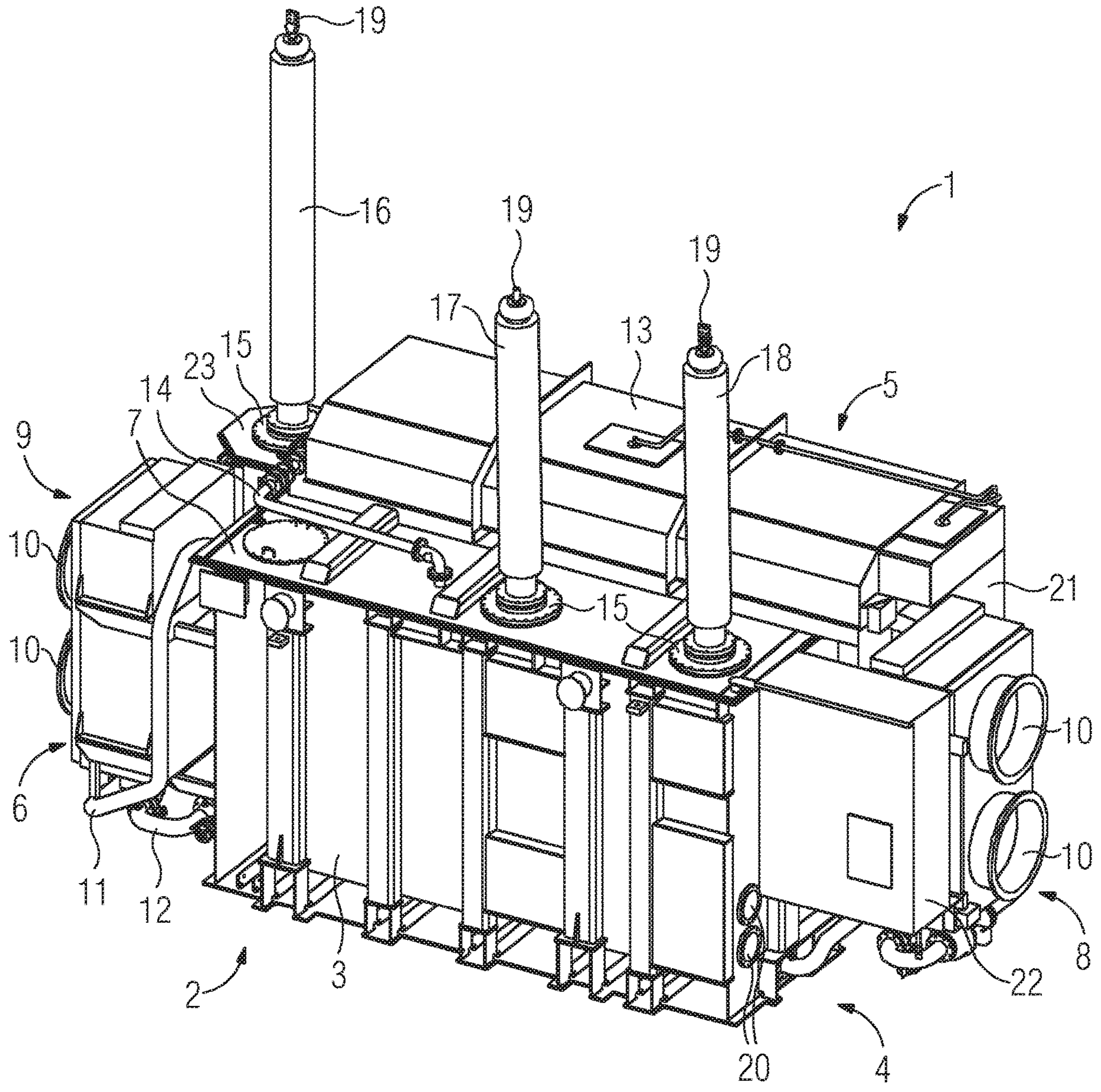
FIG. 1 shows a perspective view of an exemplary embodiment of a single-phase transformer of the power transformer unit according to the invention.

FIG. 1 shows an exemplary embodiment of a single-phase transformer 1, of a power transformer unit according to the invention, which, in addition to the single-phase transformer 1 shown in FIG. 1, also comprises two further single-phase power transformers 1 of identical design. Each single-phase transformer 1 serves for the connection of one phase of a three-phase supply grid carrying alternating voltage that here lies at a high-voltage potential of 335 kV.

The single-phase transformer 1 shown in FIG. 1 has a tank 2 that comprises a side wall 3 facing towards the observer and an end face 4 that is likewise facing towards the observer. An appropriately dimensioned side wall 5, not visible in FIG. 1, lies opposite the side wall 3, whereas an appropriately dimensioned end face 6 lies opposite the end face 4. In addition, the tank 2 has a cover 7 that closes it impermeably from above. The floor of the tank 2 is not shown on the drawing in FIG. 1.

The single-phase transformer 1 further comprises cooling equipment that consists of two cooling units 8 and 9, wherein the cooling unit 8 is firmly connected to the tank 2 at the end face 4 and the cooling unit 9 is firmly connected to the tank 2 at the end face 6. Each cooling unit 8 or 9 is fitted with fans 10 which, when required, generate a flow of air to increase the cooling capacity of the respective cooling unit 8, 9.

Each cooling unit 8, 9 is connected via an inlet 11 and an outlet 12 to the interior of the tank 2 which is filled with an insulating fluid—an ester oil in this case. It can be seen here that both the inlet 11 and the outlet 12 lead to the respective cooling unit 8 or 9 from underneath the latter.

A compensation vessel 13 extends above the tank 2 and is likewise connected via a connecting line 14 to the interior of the tank 2. Like the tank 2, the expansion vessel 13 extends in a longitudinal direction, wherein the longitudinal direction of the expansion vessel 13 and the longitudinal direction of the tank 2 run parallel to one another. The expansion vessel 13 here is essentially box-shaped and in particular flat, and has a height of about 1 m, wherein the distance between the cover 7 and the bottom face, not illustrated on the figure, of the expansion vessel 13 is about 10 cm. The important point is that the mouth of the inlet 11 is arranged underneath the mouth of the connecting line 14, so that it is ensured that the level to which the tank 2 is filled with insulating fluid is always above the entrance opening of the inlet 11.

Bushing sockets 15 are arranged in the cover 7 and are connected impermeably to the tank 2. Each bushing socket 15 forms a fastening flange for this purpose, against which it is firmly pressed onto the cover 7 of the tank 2. Expedient screwed joints, for example, are used for this purpose. In order to fasten the bushing socket 15 to the tank 2 in an airtight and fluidtight manner, sealing means shown on the drawing, which are clamped between the cover 7 and the fastening flange, are necessary. Each bushing socket 15 further comprises a receptacle section, not shown on the drawing, consisting of an electrically non-conductive, insulating material. The receptacle section tapers here toward a closed end. At the closed end, the wall of the receptacle section is penetrated by a bolt-shaped, electrically conductive contact piece. The contact piece is connected at its section that penetrates into the interior of the tank 2 to a winding connection line which extends inside the tank 2 to a winding that is arranged in the tank. Said winding is coupled inductively via a magnetizable core to a further winding.

A high-voltage bushing 16, 17, 18 is inserted in each case into each bushing socket 15 in FIG. 1. These each have an insertion section on the insertion side, whose shape is designed to be complementary to said receptacle section of the bushing socket 15, so that the two components come to lie against one another with a close fit, and air or other enclosures are avoided. At its side that faces away from said insertion section, each high-voltage bushing 16, 17, 18 is fitted with an outdoor terminal 19.

The single-phase transformer 1 further has two cable outlets 20 that are configured to receive a cable plug. The cable outlets 20 are redundant, so that if one cable outlet 20 fails, the energy supply to the consumers downstream from the transformer 1 is ensured through the still-intact cable outlet 20.

The transformer 1 is illustrated with three high-voltage bushings 16, 17 and 18 in FIG. 1. The high-voltage bushing 16 serves for the connection of an air-insulated phase conductor of a high-voltage supply grid with a voltage of 335 kV. The single-phase transformer 1 can now be adjusted so that it outputs the output voltage via the high-voltage bushing 17 or 18, wherein the output voltage is, for example, 138 kV or 134 kV. It is obvious that in this case only one output-side high-voltage bushing 17 or 18 is required, and the other high-voltage bushing does not have to be inserted into the associated bushing socket 15. It is, furthermore, also possible to apply the output voltage to the cable outlets 20, so that both high-voltage bushings 17 or 18 can be omitted. It is, finally, also possible, for example with input voltages of 245 kV, to omit the high-voltage bushing 16, wherein the high-voltage bushing 17 serves as the input for the connection of the air-insulated 245 kV conductor.

A device box 21 and a control unit 22 can be seen next to the cooling unit 8 at the end face 4, which are fastened to the tank 2 on both sides of the cooling unit 8. The tank 2 is extended in the rear region by a convexity 23 at the end face 6, which is used to accommodate the bushing socket 15 for the high-voltage bushing 16. The cooling unit 9 can be seen offset to the side next to the convexity 23.

Figure 2:
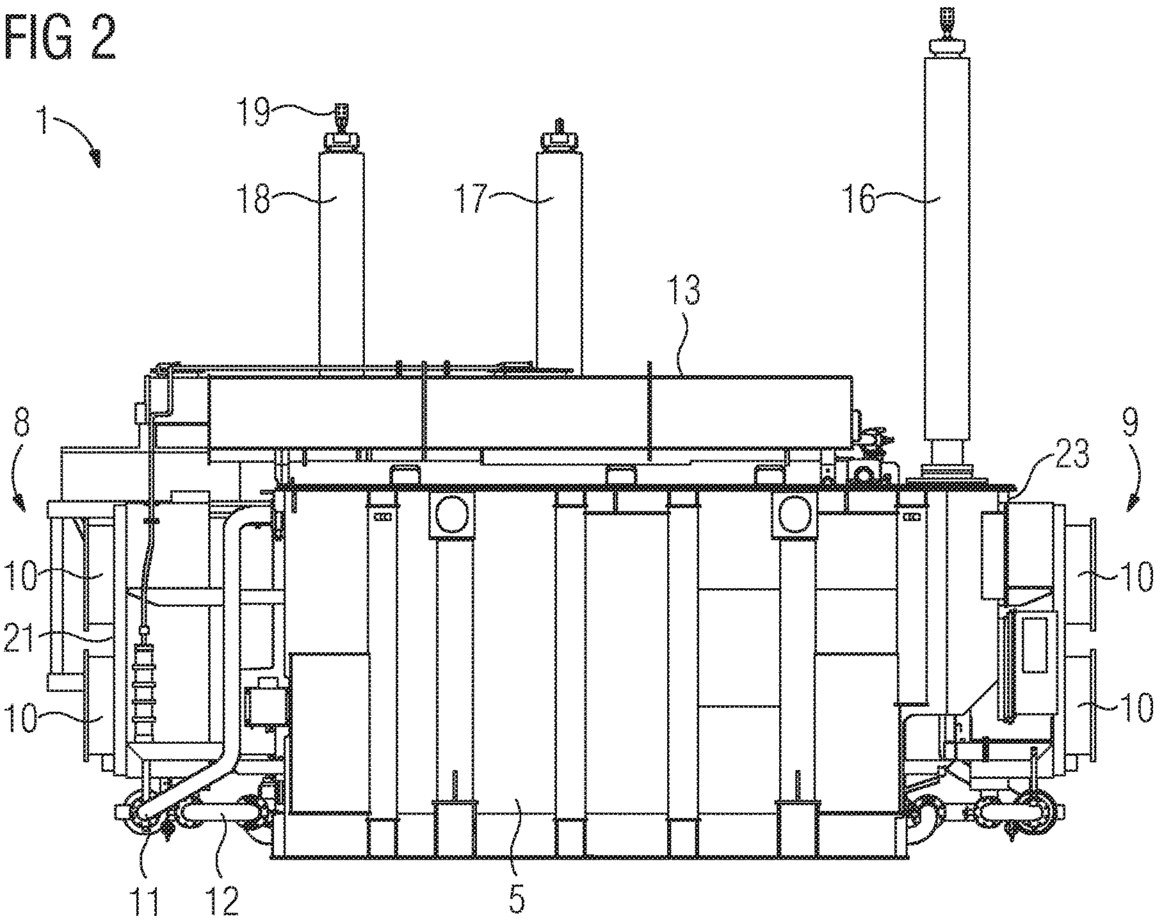
FIG. 2 shows a side view of the single-phase transformer according to FIG. 1.

FIG. 2 shows a side view of the single-phase transformer 1 according to FIG. 1, in which the convexity 23 somewhat covers the cooling unit 8 arranged behind it, so that only the fans 10 can be seen. The expansion vessel 13 is displaced to the left with respect to the tank 2 and extends over and beyond the cover 7 of the tank 2, and protrudes here over the inlet 11 of the cooling unit 8 that extends from its inlet opening arranged above at the tank 2, under the device box 21, through to the entrance opening of the cooling unit 8.

Figure 3:
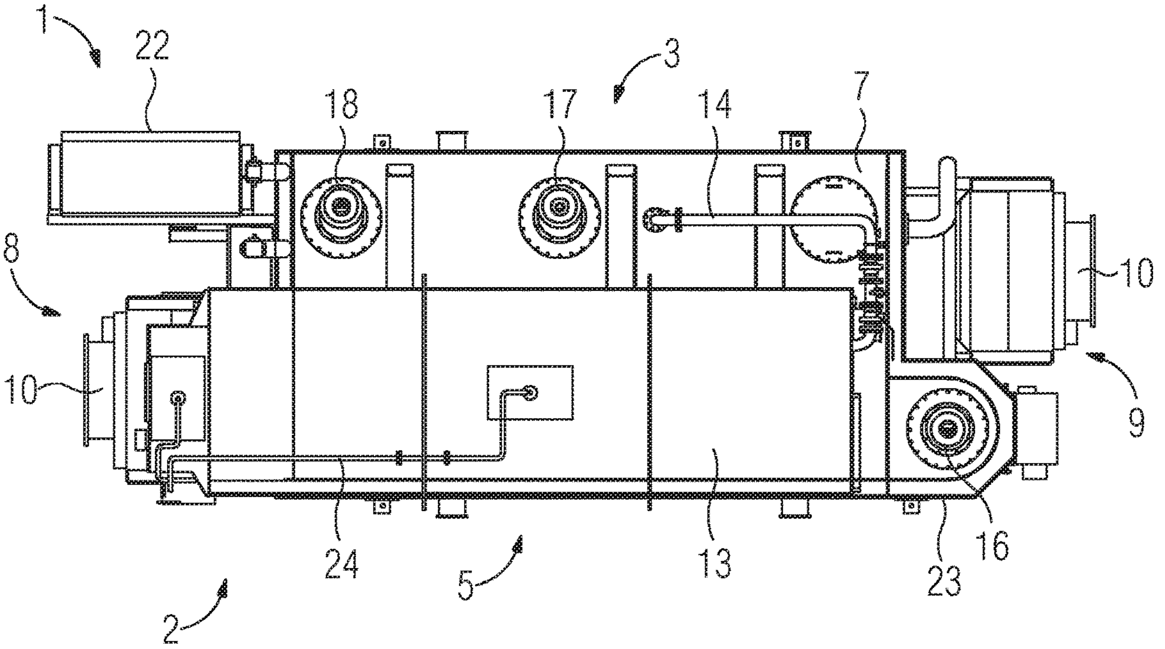
FIG. 3 shows a plan view of the single-phase transformer according to FIG. 2.

FIG. 3 shows a plan view of the single-phase transformer 1, from which the connecting line 14 is particularly easily recognized. It is also shown that the expansion vessel 13 has a ventilation line 24 that is fitted with an air drying installation in order to enable the supply of dry air to the expansion vessel 13 at its end facing away from the expansion vessel 13.

Figure 4:
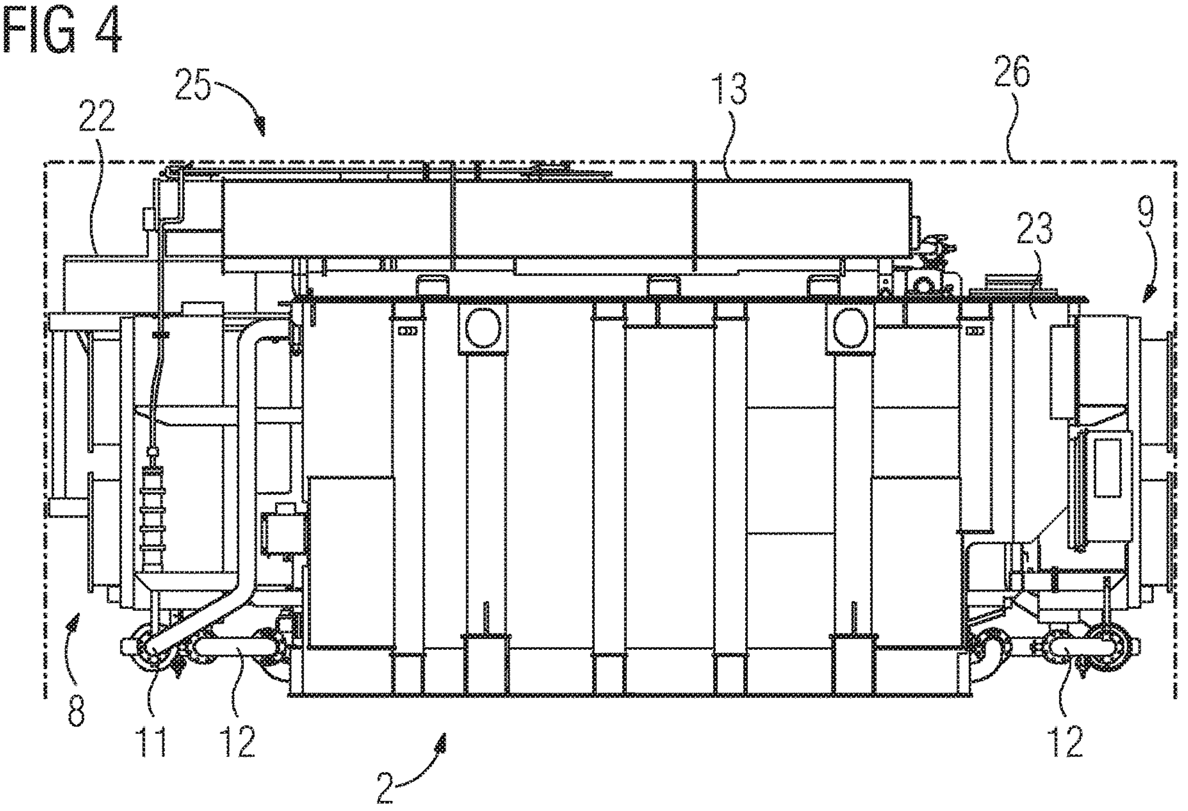
FIG. 4 shows the transport unit of a single-phase transformer according to FIG. 1 with transport profile and FIG. 5 shows a plan view of the transport unit according to FIG. 4.

FIG. 4 shows a transport unit 25 of the single-phase transformer 1 according to FIG. 1, 2 or 3, comprising all the components of the single-phase transformer 1, with the exception of the high-voltage bushing 16, 17 and 18. A transport profile 26 is moreover illustrated, which should clarify the maximum permissible size of transported items in road traffic. It can be seen that the transport unit 25 does not protrude beyond the maximum permissible transport profile 26.

This is achieved firstly in that all of the components—with the exception of the bushings 16, 17, 18—are mounted at the end faces 4 or 6. In addition, the expansion vessel 13 is of flat design, wherein the accesses, that is both the inlet and the outlet to the respective cooling units 8 and 9, are arranged underneath the respective cooling unit 8 and 9.

Figure 5:
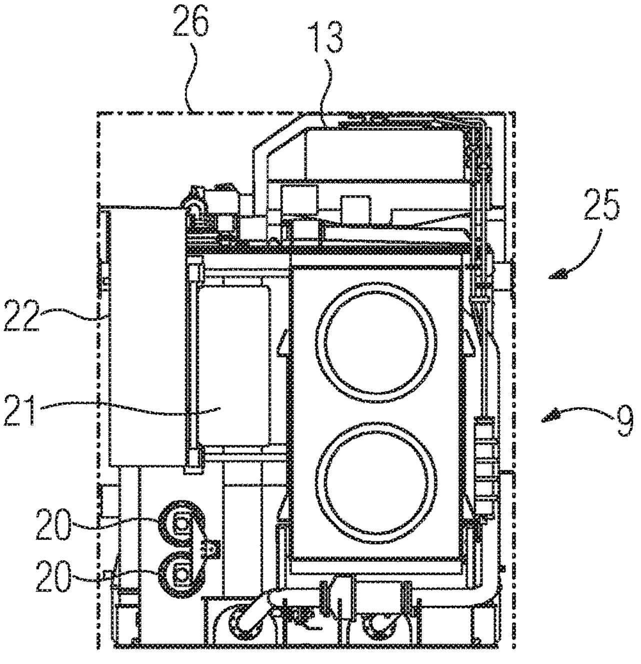

FIG. 5 shows an end view of the transport unit 25 as well as the associated transport profile 26. Here it can also be seen that the transport unit 25 lies within the transport profile 26, and is thus permitted for road transport.

The invention claimed is:

1. A transportable power transformer unit, comprising:
at least one single-phase transformer configured for connection to a high-voltage grid, each single-phase transformer including:
a tank to be filled with an insulating fluid for receiving a core with a high-voltage and low-voltage winding;
at least one bushing socket to be connected by a winding connection line extending inside said tank to the high-voltage or low-voltage winding;
at least one high-voltage bushing being inserted into said at least one bushing socket removably for transport;
cooling equipment for cooling the insulating fluid;
an expansion vessel for compensating for temperature-induced volume fluctuations of the insulating fluid;

said expansion vessel and said cooling equipment being permanently mechanically fixedly connected to said tank; and a transport unit formed of said expansion vessel, said cooling equipment, said tank and each bushing socket, said transport unit having an external contour lying inside a predefined transport profile facilitating transport of the transportable power transformer unit without said at least one high-voltage bushing extending beyond said external contour during transport, and said tank, said cooling equipment and said expansion vessel being filled with insulating fluid during the transport.

2. The power transformer unit according to claim 1, wherein said transport unit has a height less than 4.2 m, a width less than 3.3 m and a length less than 9 m.

3. The power transformer unit according to claim 1, wherein said expansion vessel is box-shaped, extends in a longitudinal direction, and has a height between 20 cm and 250 cm.

4. The power transformer unit according to claim 3, wherein said expansion vessel has a width being less than two thirds of a width of said tank.

5. The power transformer unit according to claim 4, wherein said expansion vessel has a length being greater than three quarters of a length of said tank.

6. The power transformer unit according to claim 1, wherein said tank and said expansion vessel each extend in a respective longitudinal direction, and said longitudinal directions run parallel to one another.

7. The power transformer unit according to claim 1, wherein said tank includes two mutually-opposite longitudinal faces and two mutually-opposite end faces being connected to said longitudinal faces and having a shorter width than said longitudinal faces, and said cooling equipment is disposed at least at one of said end faces.

8. The power transformer unit according to claim 7, wherein said cooling equipment includes two cooling units each disposed at a respective one of said end faces.

9. The power transformer unit according to claim 1, wherein said cooling equipment includes an inlet and an outlet both opening into said cooling equipment from underneath said cooling equipment.

10. The power transformer unit according to claim 1, wherein said tank has a cover, and said bushing sockets are disposed in said cover.

11. The power transformer unit according to claim 1, wherein the windings include an aramid insulation.

12. The power transformer unit according to claim 1, wherein the insulating fluid is an ester oil.

13. A transportable power transformer unit, comprising:

at least one single-phase transformer configured for connection to a high-voltage grid, each single-phase transformer including:

a tank to be filled with an insulating fluid for receiving a core with a high-voltage and low-voltage winding, said tank having a cover with an upper surface;

at least one bushing socket to be connected by a winding connection line extending inside said tank to the high-voltage or low-voltage winding;

at least one high-voltage bushing being inserted into said at least one bushing socket removably for transport;

cooling equipment for cooling the insulating fluid;

an expansion vessel for compensating for temperature-induced volume fluctuations of the insulating fluid;

said expansion vessel and said cooling equipment being permanently mechanically fixedly connected to said tank;

said expansion vessel extending on or over said upper surface of said cover of said tank and parallel to said tank, and said expansion vessel being spaced apart from said cover of said tank with a clearance of between 1 cm and 50 cm facilitating transport of the transportable power transformer unit; and a transport unit formed of said expansion vessel, said cooling equipment, said tank and each bushing socket, said transport unit having an external contour lying inside a predefined transport profile, and said tank, said cooling equipment and said expansion vessel being filled with insulating fluid during the transport.

* * * * *